(12) United States Patent
Furuya et al.

(10) Patent No.: US 7,764,585 B2
(45) Date of Patent: Jul. 27, 2010

(54) OPTICAL HEAD AND DISK REPRODUCING APPARATUS

(75) Inventors: Takaaki Furuya, Higashihiroshima (JP); Kenichi Tanaka, Mihara (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 655 days.

(21) Appl. No.: 11/487,233

(22) Filed: Jul. 14, 2006

(65) Prior Publication Data

US 2007/0014196 A1 Jan. 18, 2007

(30) Foreign Application Priority Data

Jul. 14, 2005 (JP) ............................. 2005-205733
Aug. 2, 2005 (JP) ............................. 2005-224602

(51) Int. Cl.
*G11B 7/135* (2006.01)
*G11B 7/00* (2006.01)

(52) U.S. Cl. ............................. 369/112.02; 369/112.22; 369/112.23; 369/112.28; 369/110.02; 369/44.23

(58) Field of Classification Search .............. 369/13.17, 369/44.41, 112.02, 44.23, 112.21, 112.22, 369/112.28, 110.02
See application file for complete search history.

(56) References Cited

U.S. PATENT DOCUMENTS

| | | | |
|---|---|---|---|
| 6,442,123 B1 * | 8/2002 | Nishimoto ............. | 369/112.01 |
| 2001/0021146 A1 * | 9/2001 | Kikuchi et al. .......... | 369/44.23 |
| 2001/0055262 A1 * | 12/2001 | Kasazumi et al. ...... | 369/112.02 |
| 2002/0093902 A1 * | 7/2002 | Hirai et al. ............. | 369/112.17 |
| 2003/0123371 A1 * | 7/2003 | Nishiyama et al. ..... | 369/112.17 |
| 2003/0223325 A1 * | 12/2003 | Shimano et al. ......... | 369/44.26 |
| 2005/0094509 A1 * | 5/2005 | Nagura .................... | 369/44.37 |
| 2005/0237880 A1 * | 10/2005 | Kobayashi ............... | 369/44.32 |
| 2006/0164956 A1 | 7/2006 | Furuya | |

FOREIGN PATENT DOCUMENTS

| | | |
|---|---|---|
| CN | 1173346 | 10/2004 |
| JP | 2000-306278 | 11/2000 |
| JP | 2002-133706 | 5/2002 |
| JP | 2003-296960 A | 10/2003 |
| JP | 2006-196122 | 7/2006 |

* cited by examiner

*Primary Examiner*—Daniell L Negrón
*Assistant Examiner*—Nicholas Lee
(74) *Attorney, Agent, or Firm*—Morrison & Foerster LLP

(57) ABSTRACT

There is provided an optical head which have no such problems regarding increase in cost and size thereof and can reduce errors by suppressing crosstalk components attributable to reflection on lands of a magneto-optical recording medium and thereby prevent degradation of reproduction characteristics. An optical element includes a light separating section for separating outgoing light and return light, and a phase compensation section for imparting phase compensation to light incident thereon. The optical element is provided on a light path of return light between an objective lens and a photodetector, so as to be closer to the photodetector than the light separating section is. This makes it possible to impart the phase compensation to the return light and prevent the degradation of reproduction characteristics. Light separating elements such as beam splitter are no more necessary in the configuration, with the result that decreases in size and cost can be realized.

11 Claims, 9 Drawing Sheets

OPTICAL HEAD AND DISK REPRODUCING APPARATUS

CROSS-REFERENCE TO RELATED APPLICATION

This application claims priority to Japanese patent Application No. JP 2005-205733 which was filed on Jul. 14, 2005 and Japanese Patent Application No. JP 2005-224602 which was filed on Aug. 2, 2005, the contents of each of which, are incorporated herein by reference, in their entirety.

BACKGROUND OF THE INVENTION

1. Field of the Invention

The present invention relates to an optical head and a disk reproducing apparatus.

2. Description of the Related Art

Among disk reproducing apparatuses, some disk reproducing apparatuses are capable of performing recording and/or reproduction on plural types of magneto-optical recording media having different physical formats, i.e., MD (Mini Disc; registered trademark) and Hi-MD optical head provided in such a disk reproducing apparatus that (registered trademark). An performs at least reproduction on plural types of magneto-optical recording media includes a light source for emitting laser light, an objective lens for converging the laser light emitted by the light source onto an information recording surface of a magneto-optical recording medium, an optical system for separating laser light that is return light reflected on the information recording surface of the magneto-optical recording medium, and a signal conversion section for converting the laser light separated by the optical system into an electrical signal.

A magneto-optical recording medium such as an MD or Hi-MD has guide grooves simply referred to as grooves provided on an information recording surface thereof. When the magneto-optical recording medium is reproduced, a disk reproducing apparatus irradiates the grooves with laser light emitted by a light source and reads information recorded in the grooves from a reflection of the irradiating light. Recently, the track pitch of magneto-optical recording media is made smaller for higher density to allow information signals to be recorded on the magneto-optical recording media as much as possible.

MDs used in the related art have a track pitch of 1.6 μm, and Mi-MDs which have recently been developed to allow high density recording have a track pitch of 1.25 μm. EFM (Eight to Fourteen Modulation) data are recorded in the grooves of an MD, and data modulated on the basis of RLL(1-7) PP are recorded in the grooves of a Hi-MD, where RLL stands for "Run Length Limited", and PP stands for "Parity preserve/Prohibit RMTR (Repeated Minimum Transition Run Length)", and RLL(1-7) PP is a physical format for recording in a density higher than that on an MD. An optical head including a light source emitting laser light having a wavelength of 780 nm and an objective lens having a numerical aperture (NA) of 0.45 is used in compatibility with both of MDs and Hi-MDs which have different physical formats as thus described.

When such an optical head is used, the diameter of a spot of laser light emitted by the light source can become larger than the track pitch, and the spot diameter can extend beyond a groove. Such light extending beyond a groove is reflected by the surface of a land adjacent to the groove, and the reflection is included in light that is reflected by the groove so that both of the reflections on the land and groove are converted into electrical signals. Such a phenomenon is referred to as crosstalk. When the reflection on the groove includes another light, many errors can be generated in the electrical signal obtained by the conversion of such light, e.g., an information recording/reproduction signal (RF signal), whereby reproduction characteristics can be degraded.

Under the circumstance, proposals have been made on optical heads in which a phase compensation element is inserted into the light path of light reflected by a magneto-optical recording medium to reduce errors by suppressing crosstalk components from the lands and to thereby prevent degradation of reproduction characteristics (for example, see Japanese Unexamined Patent Publication JP-A 2003-296960 (pp. 14-15 and FIG. 16)).

FIG. 15 is a sectional view showing a schematic configuration of a related-art optical head 1 disclosed in JP-A 2003-296960. The optical head 1 which is a discrete optical system comprises a semiconductor laser element 2 for emitting laser light, a grating 3 for separating light emitted by the semiconductor laser element 2, a beam splitter 4 for transmitting or reflecting light incident thereon, a collimator lens 5 for converting light incident thereon into parallel light, an objective lens 6 for converging laser light on a magneto-optical recording medium 11, a phase compensation element 7 for adjusting a phase of light incident thereon, a Wollaston prism 8 for separating light incident thereon, a cylindrical lens 9 for generating astigmatism with respect to light incident thereon, and a photodetector 10 serving as a light-receiving element for converting light incident thereon into an electrical signal.

The semiconductor laser element 2, which is a light source for emitting light, emits laser light having a wavelength of 780 nm when the magneto-optical recording medium 11 is an MD or Hi-MD for example. The semiconductor laser element 2 is connected to an external circuit (not shown) for supplying a drive current, and the intensity of laser light can be changed by changing the amount of a current from the external circuit.

The grating 3 is a diffraction grating for separating the light emitted by the semiconductor laser element 2 into zero-order diffracted light, −first-order diffracted light and +first-order diffracted light. The beam splitter 4 transmits outgoing light emitted by the semiconductor laser element 2 toward the magneto-optical recording medium 11 and reflects return light reflected by the magneto-optical recording medium 11. The collimator lens 5 converts diffuse light emitted by the semiconductor laser element 2 into parallel light which then exits the lens.

For example, the objective lens 6 has a numerical aperture (NA) of 0.45, and is mounted on an actuator (not shown) for holding the objective lens 6 so as to be capable of being moved in a focus direction which is a direction in parallel with the optical axis of incident light and a tracking direction which is a direction in parallel with a radial direction of the magneto-optical recording medium 11. The objective lens 6 converges outgoing light which has been emitted by the semiconductor laser element 2, on an information recording surface of the magneto-optical recording medium 11 to form a light spot thereon.

The phase compensation element 7 imparts phase compensation to light incident thereon which is return light traveling from the magneto-optical recording medium 11 to reduce errors by suppressing crosstalk components from the lands and to thereby obtain favorable reproduction characteristics. Note that the phase compensation element 7 imparts phase compensation to light incident thereon in such an amount, which is the same for MD and Hi-MD, that satisfactory reproduction characteristics will be achieved in both of a case where the magneto-optical recording medium 10 is an MD and a case where the medium is a Hi-MD.

The Wollaston prism 8 separates the return light incident thereon which has been reflected by the magneto-optical recording medium 11 and beam splitter 4 and then transmitted by the phase compensation element 7, and the Wollaston prism 8 transmits the separated light by the cylindrical lens 9 to project the light in a predetermined light-receiving region on the after-described photodetector 10. The cylindrical lens 9 imparts astigmatism to light incident thereon so that the photodetector 10 can output a focus error signal (FE signal) The photodetector 10 is a signal conversion section having the predetermined light-receiving region thereon, which converts the laser light incident thereon into an electrical signal and performs calculations on the signal to output the above-mentioned FE signal, an RF signal, and a tracking error signal (TE signal).

The laser light emitted by the semiconductor laser element 2 is transmitted by the grating 3, beam splitter 4, and collimator lens 5 to enter the objective lens 6, and the light is converged on the information recording surface of the magneto-optical recording medium 11. The laser light converged on the information recording surface of the magneto-optical recording medium 11 is reflected on a reflecting surface of the magneto-optical recording medium 11, and transmitted by the objective lens 6 and collimator lens 5, and then reflected by the beam splitter 4, thereafter transmitted by the phase compensation element 7, and separated by the Wollaston prism 8, and further transmitted by the cylindrical lens 9 so as to be received by the photodetector 10. The photodetector 10 converts the received laser light into an electrical signal and outputs the signal.

In the optical head 1 disclosed in JP-A 2003-296960, the phase of light reflected by the magneto-optical recording medium 11 is properly adjusted by the phase compensation element 7, and the phase of light reflected by the lands is adjusted. Accordingly, in the optical head 1, crosstalk is suppressed and moreover, it is possible to prevent the degradation of reproduction characteristics of both of MDs or Hi-MDs serving as magneto-optical recording medium 11.

However, the optical head 1 disclosed in JP-A 2003-296960 has such a problem that insertion of the phase compensation element 7 increases cost and size of the optical head compared to an optical head having no phase compensation element. From this viewpoint, there has been a demand for an optical head having no such problems as increases in cost and size of the optical head, which can reduce errors by suppressing crosstalk components attributable to reflection on lands of a magneto-optical recording medium and thereby prevent degradation of reproduction characteristics.

SUMMARY OF THE INVENTION

An object of the invention is to provide an optical head and a disk reproducing apparatus which have no problems regarding increase in cost and size thereof and can reduce errors by suppressing crosstalk components attributable to reflection on lands of a magneto-optical recording medium and thereby prevent degradation of reproduction characteristics.

The invention provides an optical head for recording and/or reproducing information by irradiating an optical recording medium with light, comprising:
a light source for emitting light;
an objective lens for converging outgoing light which has been emitted by the light source, on the optical recording medium;
a light-receiving element for receiving return light which has been emitted by the light source and then reflected by the optical recording medium; and
an optical element provided on a light path of the return light between the objective lens and the light-receiving element,
the optical element being composed of:
a light separating section for separating the outgoing light and return light; and
a phase compensation section for imparting phase compensation to light incident thereon,
the phase compensation section being disposed closer to the light-receiving element than the light separating section is.

According to the invention, an optical head comprises a light source for emitting light; an objective lens for converging outgoing light which has been emitted by the light source, on the optical recording medium; a light-receiving element for receiving return light which has been emitted by the light source and then reflected by the optical recording medium; and an optical element which is provided on a light path of the return light between the objective lens and the light-receiving element and provided with a light separating section. In the optical head thus described, the return light reflected by the optical recording medium enters the phase compensation section of the optical element where the phase compensation is imparted to the incident light, so that errors can be reduced by suppressing crosstalk components attributable to reflection on lands of the optical recording medium and thereby degradation of reproduction characteristics can be prevented.

Furthermore, the optical element is composed of a light separating section for separating the outgoing light and return light; and a phase compensation section for imparting phase compensation to light incident thereon. The phase compensation section is disposed closer to the light-receiving element than the light separating section is. Accordingly, by employing the optical element in the light separating section and the phase compensation section are integrated, it is not necessary to provide light separating elements such as a beam splitter which separates the outgoing light and return light to lead the separated outgoing light toward an optical recording medium and to lead the separated return light toward a light-receiving element. Since the light separating elements such as a beam splitter are large and expensive as optical components, the configuration eliminating the need to employ the light separating elements makes it possible to realize reduction in size and cost of the optical head.

Further, in the invention, it is preferable that the optical element is provided so that a face of the phase compensation section which faces the light-receiving element is inclined with respect to an optical axis of the return light between the objective lens and the light-receiving element.

According to the invention, a face of the phase compensation section of the optical element which faces the light-receiving element is inclined with respect to an optical axis of the return light between the objective lens and the light-receiving element, with the result that astigmatism can be generated on the incident light, whereby eliminating the need to provide the optical components such as a cylindrical lens for generating the astigmatism. Accordingly, it is possible to realize decrease in the number of components and further reduction in size of the optical head.

Further, in the invention, it is preferable that the optical head further comprises a diffusing angle adjusting element disposed between the optical element and the objective lens, for adjusting a diffusing angle of light incident on the objective lens.

According to the invention, the optical head further comprises a diffusing angle adjusting element disposed between the optical element and the objective lens, for adjusting a diffusing angle of light incident on the objective lens, so that decrease in size of the optical head and enhancement of coupling efficiency can be achieved.

Further, in the invention, it is preferable that the phase compensation section is a phase compensation glass having a plurality of divisions, at least one of which has a different refractive index from a refractive index of another division.

According to the invention, the phase compensation section is a phase compensation glass having a plurality of divisions. In the phase compensation glass, a refractive index of at least one division is different from that of another division. When a diffusing light enters the phase compensation glass, angles of incidence of the incident light are different from a vicinity of an optical axis of a light spot to a vicinity of peripheral parts of the light spot, and lengths of light path indicating a distance in which the incident light proceeds inside the phase compensation glass are different from the vicinity of the optical axis of the light spot and the vicinity of the peripheral parts of the light spot. Accordingly, amounts of phase change imparted when the light is transmitted by the phase compensation glass are different between the vicinity of the optical axis of the light spot and the vicinity of the peripheral parts of the light spot, resulting in variation of the amount of phase compensation within the light spot. However, use of the phase compensation glass having the plurality of divisions can make each of the divisions have a favorable refractive index and moreover an amount of phase change that is uniform within the light spot.

Further, in the invention, it is preferable that a direction in which the plurality of divisions of the phase compensation glass are arranged is parallel to a radial direction of the optical recording medium in a recording or reproducing state.

According to the invention, a direction in which the plurality of divisions of the phase compensation glass, are arranged is parallel to a radial direction of the optical recording medium in a recording or reproducing state. In the light spot of the light incident on the phase compensation glass, light in peripheral parts in the radial direction of the light spot does not include an information reproduction signal. Consequently, an angle of incidence at a boundary area of the light spot in the radial direction between a part including the information reproduction signal and a part including no information reproduction signal is smaller than an angle of incidence at the peripheral part in a tangential direction perpendicular to the radial direction and as a result, the phase compensation imparted in the radial direction can make a smaller difference of amount of the phase compensation to be imparted for a uniform phase change within the light spot, than the phase compensation imparted in the tangential direction can. From this viewpoint, it is preferable to impart the phase compensation in the radial direction. Parallelizing the direction in which the divisions are arranged, with the radial direction of the optical recording medium allows reduction in difference of the amount of phase compensation imparted within the light spot, and allows a uniform phase change within the light spot with more ease.

Further, in the invention, it is preferable that the phase compensation section comprises:

a liquid crystal element having a plurality of divisions;

a voltage applying section for applying a voltage respectively to each of the plurality of divisions of the liquid crystal element to change a refractive index of each of the divisions; and a control section for adjusting an amount of phase compensation given to each of the divisions with respect to light incident on the divisions of the liquid crystal element, and controlling an operation of the voltage applying section for applying the voltage to the divisions of the liquid crystal element so that a spot of light transmitted by the liquid crystal element undergoes a phase change which is uniform within the spot.

According to the invention, the phase compensation section comprises: a liquid crystal element having a plurality of divisions; a voltage applying section for applying a voltage respectively to each of the plurality of divisions of the liquid crystal element to change a refractive index of each of the divisions; and a control section for controlling an operation of the voltage applying section for applying the voltage to the divisions of the liquid crystal element. The control section adjusts an amount of phase compensation given to each of the divisions with respect to light incident on the divisions of the liquid crystal element, and controls an operation of the voltage applying section so that a spot of light transmitted by the liquid crystal element undergoes a phase change which is uniform within the spot. This makes it possible to reduce a difference in the amount of phase change within the light spot attributable to the angle of incidence of the light incident on the liquid crystal element and to further enhance reproduction characteristics of the optical recording medium. Furthermore, when mounted on the disc reproducing apparatus having a compatibility with plural types of optical recording mediums, it is possible to impart the optimum amount of phase compensation to any of the plural types of optical recording mediums.

Further, in the invention, it is preferable that the liquid crystal element is provided at a slant with respect to an optical axis of the return light between the light separating section and the light-receiving element.

According to the invention, the liquid crystal element is provided at a slant with respect to an optical axis of the return light between the light separating section and the light-receiving element, with the result that the astigmatism can be generated with respect to the incident light, whereby eliminating the need to provide the optical components such as a cylindrical lens for generating the astigmatism. Accordingly, it is possible to realize decrease in the number of components and reduction in size of the optical head.

Further, in the invention, it is preferable that the liquid crystal element comprises a transparent electrode in each of the divisions.

According to the invention, a transparent electrode provided in each of the divisions is used as an electrode for applying the voltage to the liquid crystal element and therefore, it is possible to prevent decrease in intensity of light, caused by the electrode which intercepts light.

Further, in the invention, it is preferable that a direction in which the plurality of divisions of the liquid crystal element is parallel to the radial direction of the optical recording medium in a recording or reproducing state.

According to the invention, a direction in which the plurality of divisions of the liquid crystal element are arranged is parallel to the radial direction of the optical recording medium in a recording or reproducing state and therefore, it is possible to reduce the difference in the amount of phase change imparted for a uniform phase change within the light spot as described above.

Further, in the invention, it is preferable that a direction in which the liquid crystal element is inclined with respect to the optical axis of the return light between the light separating section and the light-receiving element, is the radial direction of the recording medium in a recording or reproducing state.

According to the invention, a direction in which the liquid crystal element is inclined with respect to the optical axis of the return light between the light separating section and the light-receiving element, is the radial direction of the recording medium in a recording or reproducing state, with the result that by use of the liquid crystal element having the divisions arranged in parallel with the radial direction as described above, it is possible to uniformalize the phase change within the light spot and to generate the astigmatism.

Further, in the invention, it is preferable that the optical head further comprises a diffusing angle adjusting element for adjusting a diffusing angle of light incident on the objective lens, the diffusing angle adjusting element being disposed between the light source and the objective lens.

According to the invention, the optical head further comprises a diffusing angle adjusting element such as a coupling lens disposed between the light source and the objective lens, for adjusting a diffusing angle of light incident on the objective lens, so that decrease in size of the optical head and enhancement of coupling efficiency can be achieved.

Further, in the invention, it is preferable that the optical head further comprises an anisotropic element for separating the return light traveling from the optical recording medium, which has been reflected by the optical recording medium and then separated by the light separating section, to lead the separated light to enter the light receiving element, the anisotropic element being disposed between the liquid crystal element and the light-receiving element.

According to the invention, the optical head further comprises an anisotropic element such as a Wollaston prism disposed between the liquid crystal element and the light-receiving element, for separating the return light from the optical recording medium, which has been reflected by the optical recording medium and then separated by the light separating section, to lead the separated light to enter the light receiving element and therefore, it is possible to lead the light to enter a light-receiving region provided in the light-receiving element so that the information reproduction signal and the like can be obtained.

Further, in the invention, it is preferable that the light source emits laser light having a wavelength of 780 nm or less, and the objective lens has a numerical aperture (NA) of 0.45 or more.

According to the invention, the light source emits laser light having a wavelength of 780 nm or less, and the objective lens has a numerical aperture (NA) of 0.45 or more, with the result that a favorable information reproduction signal can be obtained in accordance with various optical recording mediums.

Further, the invention provides a disc reproducing apparatus having the optical head described above.

According to the invention, a disc reproducing apparatus has the optical head having one or more features described above and therefore, it is possible to provide a disc reproducing apparatus having no such problems as increases in cost and size of the optical head, which can reduce errors by suppressing crosstalk components attributable to reflection on lands of the optical recording medium and thereby enhance the reproduction characteristics. Note that the disc reproducing apparatus is not limited to the apparatus for only reproducing the information recorded on the optical recording medium, and also included is an apparatus for both of recording the information onto the optical recording medium and reproducing the information recorded on the optical recording medium.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERED EMBODIMENTS

Figure 1:
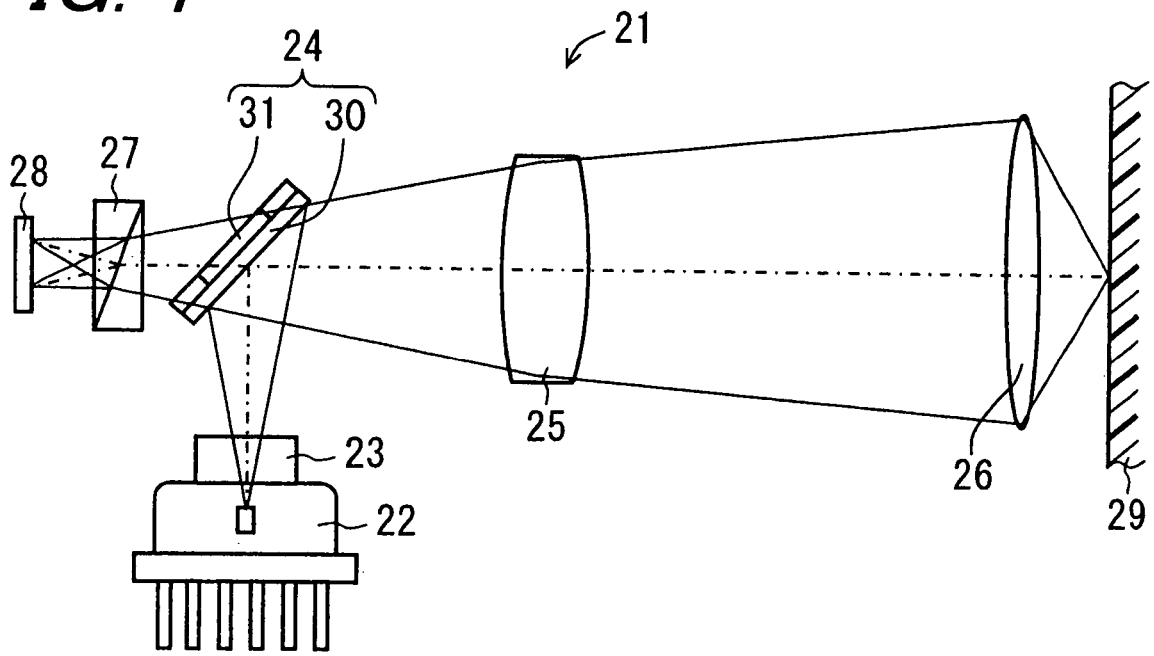
FIG. 1 is a side view showing a schematic configuration of an optical head according to a first embodiment of the invention.

Now referring to the drawings, preferred embodiments of the invention are described below.

FIG. 1 is a side view showing a schematic configuration of an optical head 21 according to a first embodiment of the invention. The optical head 21 comprises a semiconductor laser element 22, a grating 23, an optical element 24, a diffusing angle adjusting element 25, an objective lens 26, a Wollaston prism 27, and a photodetector 28.

The optical head 21 according to the present embodiment is characterized in that the optical element 24 is provided on a light path of return light between the objective lens 26 and the photodetector 28, and provided with a light separating section 30 for separating outgoing light and return light and a phase compensation glass 31 serving as a phase compensation section for imparting phase compensation to light incident thereon.

In the context of the invention, the term "the amount of phase compensation" means the amount of phase change that is imparted to incident light by the phase compensation section, and the term "the amount of phase change" means the amount of phase change of light as a result of the application of the phase compensation by the phase compensation section.

The semiconductor laser element 22 is a light source for emitting light. The semiconductor laser element 22 emits laser light having a wavelength of 780 nm, for example, when the optical recording medium 29 is a magneto-optical recording medium such as an MD or Hi-MD or an optical recording medium such as a CD (Compact Disk). The semiconductor laser element 22 emits laser light having a wavelength of 630 to 690 nm when the optical recording medium 29 is an optical recording medium such as a DVD (Digital Versatile Disk). The semiconductor laser element 22 emits blue laser light having a wavelength of 390 to 460 nm, for example, when the optical recording medium 29 is an optical recording medium such as Blu-ray disc (registered trademark). The semiconductor laser element 22 is connected to an external circuit (not shown) for supplying a drive current, and the intensity of the laser light can be changed by changing the amount of the current from the external circuit. The light emitted by the semiconductor laser element 22 enters the grating 23.

The grating 23 is a diffraction grating for separating the light emitted by the semiconductor laser element 22 into zero-order diffracted light, −first-order diffracted light and +first-order diffracted light. The laser light transmitted by the grating 23 enters the optical element 24.

The optical element 24 comprises the light separating section 30 for separating outgoing light and return light, and the phase compensation glass 31 for imparting phase compensation to light incident thereon. The light separating section 30 and the phase compensation glass 31 integrally constitute the optical element 24.

For the light separating section 30, a half mirror can be used, for example. The light separating section 30 is provided so that a face thereof on an opposite side to a side of the light separating section 30 which faces the phase compensation glass 31 is inclined with respect to an optical axis of outgoing light which is emitted by the semiconductor laser element 22 and enters the light separating section 30 and with respect to an optical axis of return light which is emitted by the semiconductor laser element 22 and reflected by the optical recording medium 29 and then enters the light separating section 30. By the light separating section 30 according to the embodiment, the outgoing light emitted by the semiconductor laser element 22 is reflected so to be guided to the objective lens 26, and the return light which has been emitted by the semiconductor laser element 22 and then reflected by the optical recording medium 29, is transmitted.

The phase compensation glass 31 is disposed so as to be closer to the photodetector 28 than the light separating section 30 is. For the phase compensation glass 31, an optical glass substrate having phase compensation function can be used, for example. The phase compensation glass 31 imparts phase compensation to the return light by transmitting and refracting the return light which has been separated from the outgoing light at the light separating section 30. A specific configuration of this phase compensation glass 31 will be hereinafter described. The outgoing light which has been emitted from the semiconductor laser element 22 and entered the optical element 24, is reflected by the light separating section 30 to enter the diffusing angle adjusting element 25.

The diffusing angle adjusting element 25 is disposed between the optical element 24 and the optical lens 26, and adjusts a diffusing angle of light incident on the optical lens 26. For the diffusing angle adjusting element 25, it is possible to use, for example, a collimator lens for converting light incident thereon into parallel light, and a coupling lens for changing a diffusing angle of light incident thereon. Of these lenses, particularly preferable is the coupling lens which allows reduction in size in a direction of optical axis of emitted light of the optical head 21 and reduction in size in a focus direction of the objective lens 26 and moreover, enhances the intensity of light exiting the objective lens 26. The light of which diffusing angle has been adjusted by the diffusing angle adjusting element 25 enters the objective lens 26.

The objective lens 26 converges the light which has been emitted by the semiconductor laser element 22, on the optical recording medium 29. For example, when the optical recording medium 29 is a magneto-optical recording medium such as an MD or Hi-MD, or when the optical recording medium 29 is an optical medium such as a CD, an objective lens 26 having a numerical aperture (NA) of 0.45 is used. Further, when the optical recording medium 29 is an optical recording medium such as a DVD, an objective lens 26 having a numerical aperture (NA) of 0.6, and when the optical recording medium 29 is an optical recording medium such as a blue ray disk, an objective lens 26 having a numerical aperture (NA) of 0.85 is used.

The objective lens 26 is held by an actuator (not shown) which can be moved in the focus direction that is a direction of the optical axis of light incident thereon and in a tracking direction that is a direction in parallel with a radial direction which is a direction of a radius of the optical recording medium 29 in a recording or reproducing state which radius passes a center of a light spot formed on the optical recording medium. The objective lens 26 converges outgoing light which has been emitted by the semiconductor laser element 22, on the information recording surface of the optical recording medium 29 to form a light spot on the information recording surface. The light converged on the optical recording medium 29 is reflected by the information recording surface of the optical recording medium 29 and then referred to as return light, and thereafter is transmitted by the diffusing angle adjusting element 25 and light separating section 30 of optical element 24 to enter the phase compensation glass 31 of the optical element 24. Here, descriptions will be made on the light which is converged on the optical recording medium 29 by the objective lens 26.

Figure 2:
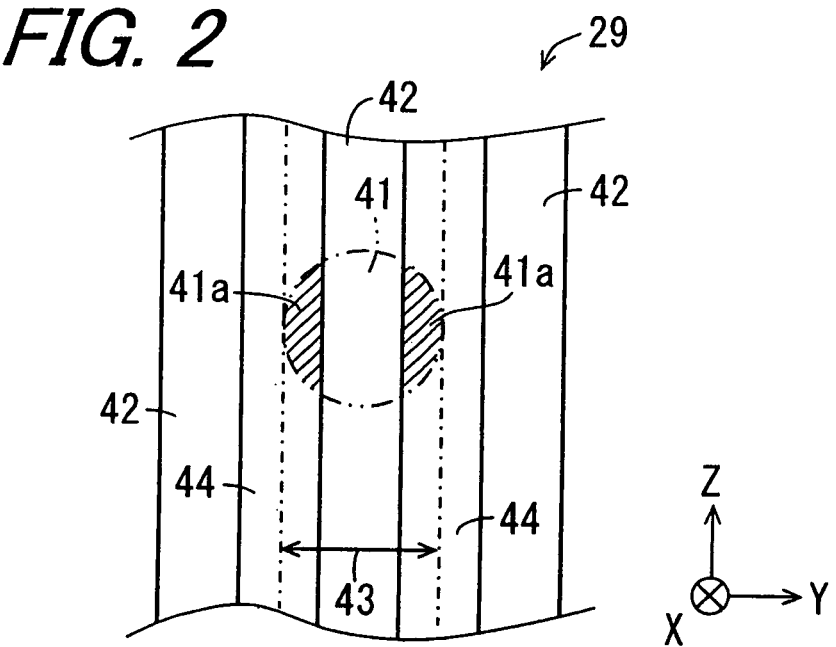
FIG. 2 is a schematic plan view showing an information recording surface of an optical recording medium, on which a light spot is being formed.

FIG. 2 is a schematic plan view showing the information recording surface of the optical recording medium 29, on which a light spot 41 is being formed. Grooves 42 in the form of guide grooves for recording an information reproduction signal is formed on the information recording surface of the optical recording medium 29. Note that three-dimensional X-Y-Z axes shown in FIG. 2 are defined as follows. An X-axis direction indicates a direction perpendicular to the information recording surface of the optical recording medium 29 in a recording or reproducing state, which direction is also referred to as a focus direction. A Y-axis direction indicates a radial direction of the optical recording medium 29 in a recording or reproducing state, which direction is also referred to as a tracking direction. A Z-axis direction indicates a direction in which a groove 42 of the optical recording medium 29 extends and which is orthogonal to the tracking direction. The Z-axis direction is also referred to as a tangential direction. The radial direction of the optical recording medium 29, which indicates the Y-axis direction, represents a radial direction of the optical recording medium 29 in an optical axis of light which has been emitted by the semiconductor laser element 22 and converged on the information recording surface of the optical recording medium 29. The above definitions of the three directions of X-Y-Z axes are common throughout the present description.

When information recorded on the optical recording medium 29 is to be reproduced, the optical head 21 irradiates the interior of the groove 42 with a light spot 41 formed by the laser light emitted by the semiconductor laser element 22 and reads the information recorded in the groove 42 from a reflection of the irradiating laser light.

The optical recording medium 29 has a track pitch 43 of 1.6 μm when the medium is an MD, and the track pitch 43 of 1.25 μm when the medium is a Hi-MD which can achieve recording in a high density. When information is recorded or reproduced on or from the optical recording medium 29 with the optical head 21, a light spot formed by laser light emitted by the semiconductor laser element 22 to irradiate the optical recording medium 29 has a diameter of, for example, 1.6 μm, and the light spot 41 extends beyond the groove 42 in such a case.

The light in the regions 41a of the light spot extending beyond the groove 42 is reflected on the surface of lands 44 which are adjacent to the groove 42, and is included in light reflected by the groove 42. Such a phenomenon is referred to as crosstalk. When the light reflected by the groove 42 includes another light, many errors can be generated in an electrical signal, e.g., an information reproduction signal (RF signal) obtained by converting the light with the after-described photodetector 28 for receiving the light, whereby reproduction characteristics can be degraded.

In order to prevent such a degradation of reproduction characteristics, the optical element 24 of the optical head 21 according to the invention is provided with the phase compensation glass 31 serving as a phase compensation section for imparting phase compensation to return light to suppress crosstalk components from the lands 44 and to thereby reduce errors. Hereinbelow will be described a configuration of the phase compensation glass 31.

Figure 3:
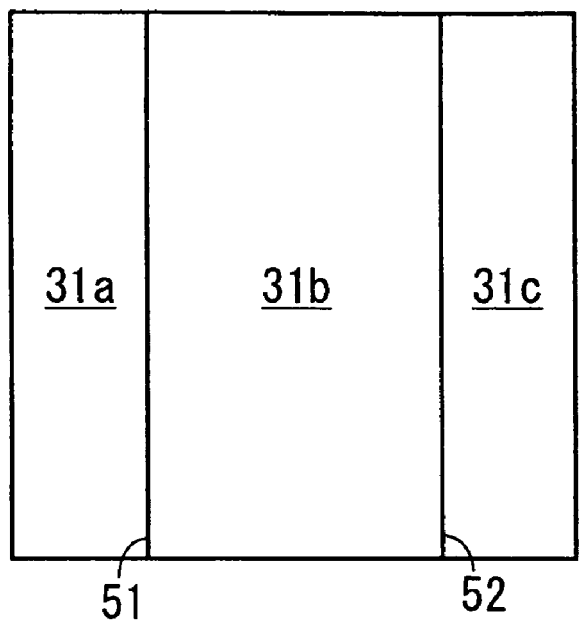
FIG. 3 is a plan view schematically showing a configuration of a phase compensation glass.
Figure 3:
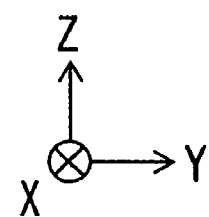

FIG. 3 is a plan view schematically showing a configuration of the phase compensation glass 31. The phase compensation glass 31 is characterized as being a platy member having a rectangular planar shape, and divided by division lines 51 and 52 extending in the Z-axis direction into a plurality of (three in the present embodiment) divisions 31a, 31b, and 31c which are arranged in a direction parallel to the Y-axis direction that is a radial direction of the optical recording medium 29 in a recording or reproducing state. Further, in the embodiment, refractive indexes of a plurality of divisions 31a, 31b, and 31c of the phase compensation glass 31 are set so that refractive indexes of the divisions 31a, 31b, and 31c are different from each other and phase changes of light which enters the respective divisions to be subjected to application of the phase compensation are uniform within the light spot.

Here, descriptions will be made on a problem arising when diffuse light enters the phase compensation glass having a uniform refractive index on a surface where incident light enters. When light enters such a phase compensation glass, a different angle of incidence of light leads a different length of light path that is a distance in which the incident light proceeds inside the phase compensation glass, resulting in a different amount of phase change of light transmitted by the phase compensation glass. Such fluctuation in amount of phase change causes problems not only for a plurality of light having different angles of incidence from each other, but also in a case where the incident light is diffuse light, for relation between light in the vicinity of the optical axis of light spot and light in the vicinity of peripheral parts on both sides of the light spot having the optical axis as a center.

More specifically, when the diffuse light enters the phase compensation glass, the incident light enters the light spot at different angles of incidence between in the vicinity of the optical axis of the light spot and in the vicinity of the peripheral parts of the light spot, resulting in a difference in the length of light path that is a distance in which the incident light proceeds inside the phase compensation glass, between the light incident in the vicinity of the optical axis of the light spot and the light incident in the vicinity of the peripheral part of the light spot. Further, when the light incident in the vicinity of the optical axis of the light spot and the light incident in the vicinity of the peripheral parts of the light spot are different from each other in length of light path, the light incident in the vicinity of the optical axis of the light spot and the light incident in the vicinity of the peripheral parts of the light spot are subjected to different amounts of phase change which is imparted by transmission through the phase compensation glass. For that reason, when using the phase compensation glass having a uniform refractive index on the surface where the incident light enters, a state of polarization of the light at the peripheral parts of the light spot is shifted from linear polarization to elliptic polarization, so that variation is generated in the amount of phase change within the light spot.

In order to solve the above problem, the phase compensation glass 31 according to the embodiment is divided into a plurality of divisions 31a, 31b, and 31c, and the refractive indexes of the divisions 31a, 31b, and 31c are respectively set so that phase changes of light which enters the respective division to be subjected to application of the phase compensation, are uniform within the light spot. It is thus possible to achieve, within the light spot, a uniform amount of phase change of the light to which the phase compensation has been imparted by the phase compensation glass 31.

The phase compensation glass 31 preferably imparts a phase change such that a polarization axis of light adjusted to linear polarization will be in parallel with the Y-axis direction that is the radial direction of the optical recording medium 29 in a recording or reproducing state. The reason will be described hereinbelow.

As shown in FIG. 2, the phase compensation glass 31 is used to suppress crosstalk components attributable to reflection on the surface of the lands 44 adjacent to the groove 42. Here, an attention will be paid to the light spot 41 at the time of obtaining an information reproduction signal in the groove 42. When viewed in the Z-axis direction, the information reproduction signal recorded in the groove 42 is included up to the peripheral parts of the light spot 41. In contrast, when viewed in the Y-axis direction, the information reproduction signal is not included in the regions 41a of the light spot located on the peripheral parts of the light spot 41 because the lands 44 are irradiated. That is to say, when the light spot 41 is viewed in the Y-axis direction, the information reproduction signal exists only in the vicinity of the center of the light spot 41.

Since a phase is represented by a wave, a phase of a reflected light will now be discussed on an assumption that the phase may be divided into a P-wave that is a wave in the Y-axis direction and an S-wave that is a wave in the Z-axis direction. When the optical recording medium 29 is an MD, the P-wave and S-wave of light reflected by the optical recording medium 29 are substantially in phase (S−P=0°). When the optical recording medium 29 is a Hi-MD, however, the P-wave of light reflected by the optical recording medium 29 is delayed from the S-wave by δ (S−P=δ).

When an equation δ=0° can be obtained by application of the phase compensation through the phase compensation glass 31, optimum reproduction characteristics can be achieved even when the optical recording medium 29 is a Hi-MD. For obtaining such an equation δ=0°, two methods are available. One method is to delay the S-wave that is a wave in the Z-axis direction by δ, and the other method is to advance the P-wave that is a wave in the Y-axis direction by δ or to delay the P-wave that is a wave in the Y-axis direction by 2π−δ.

As described above, when viewed in the Z-axis direction, the information reproduction signal recorded in the groove 42 is included up to the peripheral parts of the light spot 41. Therefore, according to the method in which the S-wave that is a wave in the Z-axis direction is delayed by δ, a phase change needs to be imparted also to the peripheral parts of the light incident on the phase compensation glass 31. As a result, even with the phase compensation glass 31 provided in the optical head 21 according to the embodiment, a slight difference is generated in the amount of phase change within the light spot.

When viewed in the Y-axis direction, an information reproduction signal recorded in the groove 42 is not included in the peripheral parts of the light spot 41. Therefore, according to the method in which the P-wave that is a wave in the Y-axis direction is advanced by δ, the information reproduction signal is not included in the peripheral parts of the light incident on the phase compensation glass 31. As a result, even when a slight difference is generated in the amount of phase change within the light spot, the angle of incidence at boundary areas between the part including the information reproduction signal and the parts including no information reproduction signal is smaller than the angle of incidence at the peripheral parts of the light spot in the Y-axis direction. Therefore, the resultant information reproduction signal includes substantially no difference in the amount of phase change.

As described above, the angle of incidence at the boundary areas between the part including the information reproduction signal and the parts including no information reproduction signal in the Y-axis direction of the light spot 41 is smaller than the angle of incidence at the peripheral parts of the spot in the Z-axis direction perpendicular to the Y-axis direction. Therefore, variation in the amount of phase compensation imparted to cause a uniform phase change within the light spot will be smaller when the phase change is imparted in the Y-axis direction than when the phase change is imparted in the Z-axis direction. Accordingly, the divisions 31a, 31b, and 31c of the phase compensation glass 31 are arranged in a direction parallel to the Y-axis direction of the optical recording medium 29, and favorable phase changes are respectively imparted to each division 31a, 31b, and 31c of the phase compensation glass 31 so as to reduce variation in the amount of phase compensation imparted within the light spot. This makes it possible to more easily obtain a phase change that is uniform within the light spot.

Further, the optical element 24 according to the embodiment is provided so that a face of the phase compensation glass 31 which faces the photodetector 28 is inclined with respect to an optical axis of return light between the objective lens 26 and the photodetector 28. This makes it possible to generate astigmatism with respect to the return light from the optical recording medium 29, which enters the phase compensation glass 31, so that optical components such as a cylindrical lens for generating astigmatism are no more necessary in the configuration and as a result, it is possible to realize decrease in the number of components and further reduction in size of the optical head.

Note that the inclination of the face of the phase compensation glass 31 which faces the photodetector 28 may increase a difference in the length of light path between the light incident on one peripheral part of the spot of incident light that is diffuse light, and the light incident on the other peripheral part on an opposite side of the one peripheral part, however, according to the embodiment, the phase compensation glass 31 is divided into divisions where favorable refractive indexes are set, thereby to enable prevention of difference in the amount of phase change from being generated in the light spot even when the phase compensation glass 31 is disposed at a slant.

To the return light traveling from the optical recording medium 29, which has been transmitted by the phase compensation glass 31 as described above, are imparted the phase change and astigmatism by means of the phase compensation glass 31 and then, the light enters the Wollaston prism 27.

The Wollaston prism 27 is an anisotropic element for leading the return light traveling from the optical recording medium 29 to enter the photodetector 28, the return light which is reflected by the optical recording medium 29 and separated by the light separating section 30 of the optical element 24 and moreover subjected to application of phase compensation and astigmatism through the phase compensation section 31. The Wollaston prism 27 is disposed between the optical element 24 and the photodetector 28. The Wollaston prism 27 separates the light incident thereon into, for example, a main signal which is used for a servo system for detecting a focus error signal (FE signal) and a tracking error signal (TE signal) and an I-signal and a J-signal which are used as MO (Magneto-Optical) signals (RF signals), and projects the signals on respective light-receiving regions of the photodetector 28.

The photodetector 28 is a light-receiving element for receiving return light reflected by the optical recording medium 29. The photodetector 28 converts laser light incident thereon into an electrical signal and performs calculations on the signal to output an FE signal, a TE signal, and an RF signal. The photodetector 28 is provided with a plurality of light-receiving regions.

Figure 4:
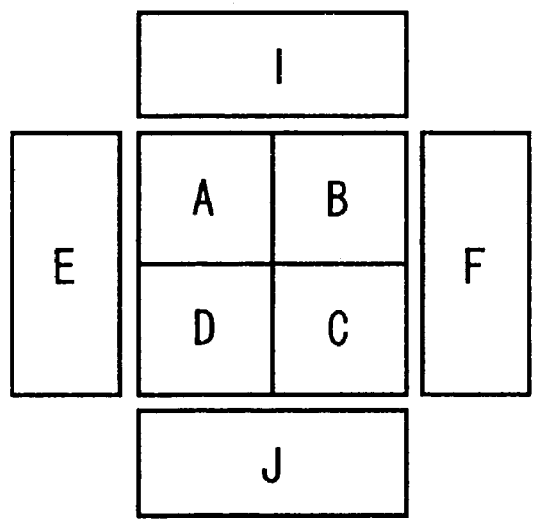
FIG. 4 is a plan view schematically showing a configuration of a photodetector having a plurality of light-receiving regions provided thereon.
Figure 4:
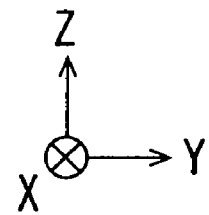

FIG. 4 is a plan view schematically showing a configuration of the photodetector 28 having a plurality of light-receiving regions provided thereon. The photodetector 28 includes, for example, light-receiving regions A, B, C, and D, two rectangular light-receiving regions E and F, and two rectangular light-receiving regions I and J. The light-receiving regions A, B, C, and D are four rectangular divisional light-receiving regions having equal areas disposed in the form of a matrix of two rows and two columns. The two rectangular light-receiving regions E and F are disposed in the Y-axis direction on both sides of the light-receiving regions A to D. The two rectangular light-receiving regions I and J are disposed in the Z-axis direction on both sides of the light-receiving regions A to D. The light-receiving regions A to D receive light which is zero-order light separated by the grating 23 and which has astigmatism generated by the phase compensation glass 31 and is used for the main signal separated by the Wollaston prism 27, and then output an FE signal by the astigmatism method. The light-receiving regions E and F receive −first-order diffracted light and +first-order diffracted light separated by the grating 23 which are used for the main signal separated by the Wollaston prism 27, and then detect a TE signal. The light-receiving regions I and J receive light which is zero-order diffracted light separated by the grating 23 and which is used for the I- and J-signals separated by the Wollaston prism 27, and then detect an RF signal.

Figure 5:
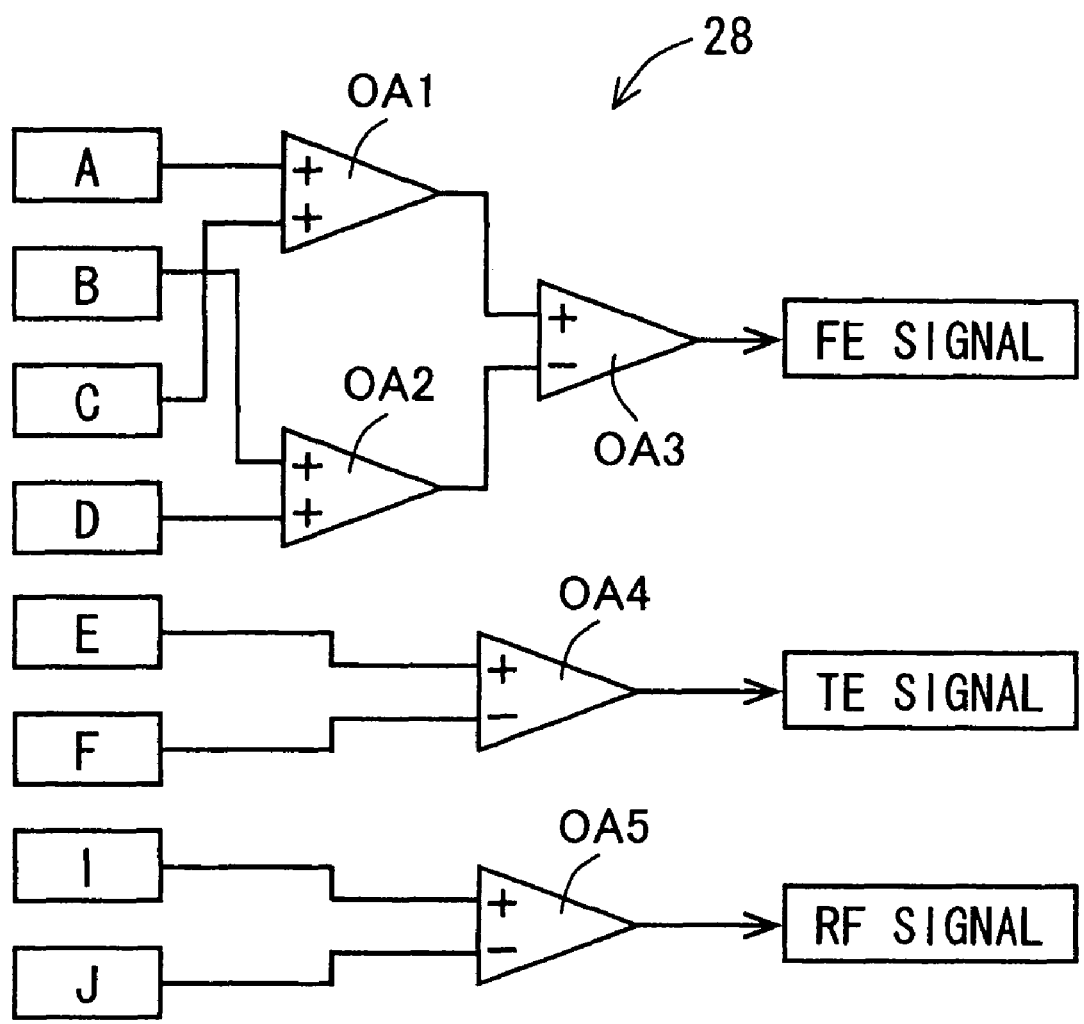
FIG. 5 is an electrical diagram showing an electrical configuration of the photodetector.

FIG. 5 is an electrical diagram showing an electrical configuration of the photodetector 28. The photodetector 28 comprises computing units OA1 and OA2 which are adders, and computing units OA3, OA4, and OA5 which are subtracters. The photodetector 28 receives return light in the respective light-receiving regions A to J and outputs electrical signals by use of the computing units OA1 to OA5 as shown in the following expressions. In the following expressions, the value represented by the signal detected at each of the light-receiving regions is indicated by "S" preceding the alphabet representing the light-receiving region.

$FE$ signal $=(SA+SC)-(SB+SD)$ $TE$ signal $=SE-SF$ $RF$ signal $=SI-SJ$

The operation of the optical head 21 will be described hereinbelow. Laser light emitted by the semiconductor laser element 22 passes through the grating 23 to be separated into zero-order diffracted light, +first-order diffracted light, and −first-order diffracted light which are then reflected by the light separating section 30 of the optical element 24. The laser light reflected by the light separating section 30 passes through the diffusing angle adjusting element 25 at which the diffusing angle of the light is changed. The light is thereafter converged on the information recording surface of the optical recording medium 29 by the objective lens 26. The light converged on the optical recording medium 29 is reflected by the optical recording medium 29 and transmitted by the objective lens 26 and the diffusing angle adjusting element 25 and further transmitted by the light separating section 30 of the optical element 24 to enter the phase compensation glass 31 which is integrally formed with the light separating section 30.

Since the phase compensation glass 31 is divided into a plurality of regions of which refractive indexes are different from each other, the return light incident on the phase compensation glass 31 undergoes phase compensation in such an amount that a difference in the amount of phase change within the light spot attributable to the angle of incidence of the light can be reduced. Further, the phase compensation glass 31 is provided so that a face thereof facing the photodetector 28 is inclined with respect to the optical axis of the return light between the objective lens 26 and the photodetector 28, to thereby impart the astigmatism to the light incident on the phase compensation glass 31.

The return light to which the phase change and the astigmatism have been imparted by the phase compensation glass 31 is separated by the Wollaston prism 27 and received at a predetermined position of the photodetector 28. The photodetector 28 outputs electrical signals, i.e., the FE signal, the TE signal, and the RF signal using the received laser light.

As described above, in the optical head 21 according to the present embodiment, the phase compensation glass 31 is divided into a plurality of regions 31a, 31b, and 31c of which refractive indexes are different from each other, to thereby allow change of the amount of phase compensation which is imparted to the incident light, respectively for each of the regions. It is therefore possible to reduce a difference in the amount of phase change within the light spot and to thereby enhance reproduction characteristics of the optical recording medium 29. Furthermore, the phase compensation glass 31 is provided at a slant and as a result, optical components for generating astigmatism such as a cylindrical lens are no more necessary and it is thus possible to realize reduction in size of the optical head.

The above-described configuration of the optical head 21 is not restrictive and therefore may be subjected to various modifications. In the optical head 21 according to the embodiment, the phase compensation glass 31 used has regions bounded by the division lines 51 and 52 of which regions have different refractive indexes from each other. However, without being limited to this configuration, it may be possible to use other components including, for example, a gradient index glass having a refractive index changing inside the phase compensation glass.

Figure 6:
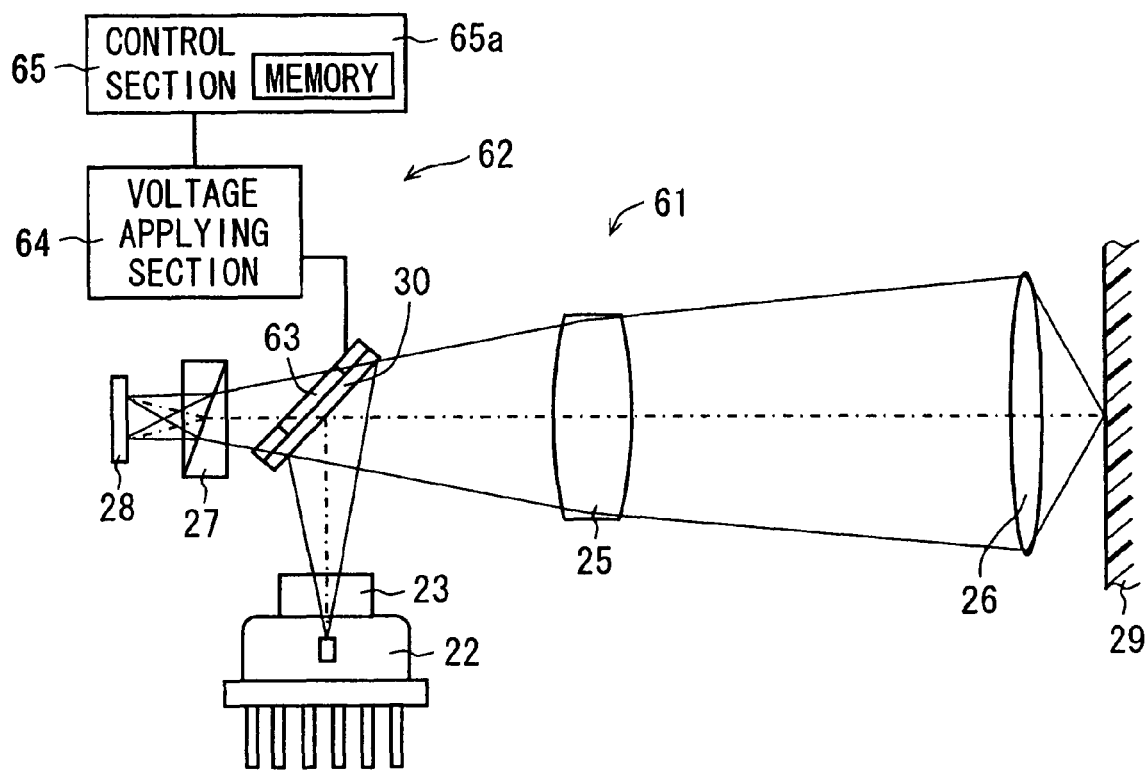
FIG. 6 is a sectional view showing a schematic configuration of an optical head according to a second embodiment of the invention.

FIG. 6 is a sectional view showing a schematic configuration of an optical head 61 according to a second embodiment of the invention. The optical head 61 according to the present embodiment is similar to the optical head 21 according to the first embodiment, so that the corresponding components will be denoted by the same reference numerals, and descriptions thereof will be omitted.

The optical head 61 according to the second embodiment is characterized as comprising a liquid crystal element 63, a voltage applying section 64, and a control section 65. The liquid crystal element 63 has a plurality of divisions as a phase compensation section of an optical element 62. The voltage applying section 64 applies a voltage respectively to each of the plural divisions of the liquid crystal element 63 to thereby change refractive indexes of the respective divisions. The control section 65 adjusts the amount of phase compensation imparted to light incident on each of the divisions of the liquid crystal element 63, and controls the operation of the voltage applying section 64 for applying a voltage to the divisions of the liquid crystal element 63 so that a spot formed by light transmitted by the liquid crystal element 63 undergoes a phase change that is uniform within the spot.

Figure 7:
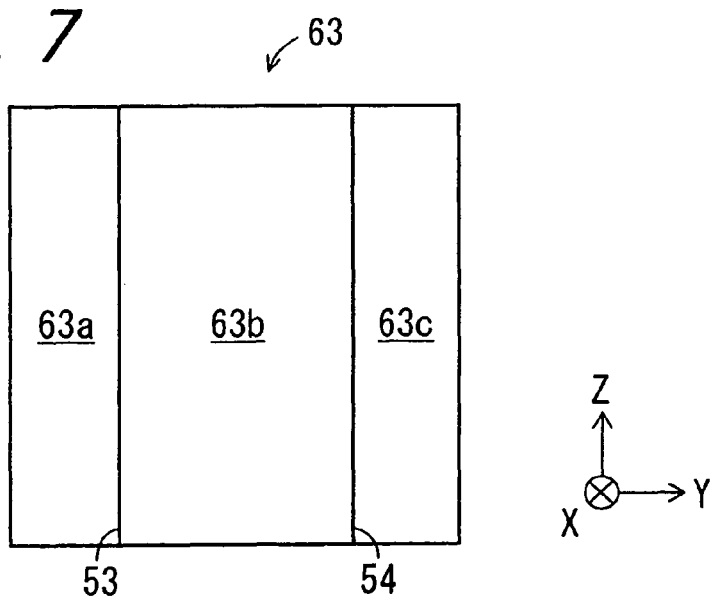
FIG. 7 is a plan view schematically showing a configuration of a liquid crystal element.

FIG. 7 is a plan view schematically showing a configuration of the liquid crystal element 63. The liquid crystal element 63 is integrally formed with the light separating section 30 of the optical element 62, and disposed closer to the photodetector 28 than the light separating section 30 is. Further, the liquid crystal element 63 provided in the optical head 61 according to the invention is a platy member having a rectangular planar shape, having a plurality of (three in the present embodiment) divisions 63a, 63b, and 63c obtained by division lines 53 and 54 extending in the Z-axis direction. Moreover, a direction in which the plurality of divisions 63a, 63b, and 63c are arranged is parallel to the Y-axis direction that is a radial direction of the optical recording medium 29 in a recording or reproducing state.

In each of the divisions 63a, 63b, and 63c of the liquid crystal element 63, there is provided a pair of transparent electrodes, i.e., a transparent electrode connected to the voltage applying section 64 and another transparent electrode disposed opposite to the transparent electrode connected to the voltage applying section 64, and a liquid crystal layer disposed between the pair of transparent electrodes. Such liquid crystal layers and transparent electrodes are confined between glass substrates.

A voltage is applied from the voltage applying section 64 to the liquid crystal element 63 through the transparent electrodes provided in the divisions 63*a*, 63*b*, and 63*c*. The voltage applying section 64 is thus configured so as to be capable of applying voltage of different values respectively to each of the divisions 63*a*, 63*b*, and 63*c*. As electrodes provided in the plurality of divisions of the liquid crystal element 63 are used the transparent electrodes which do not intercept light, so that decrease in intensity of the light passing through the liquid crystal element 63 can be prevented. In the liquid crystal element 63, the refractive index of the liquid crystal layer is changed by applying a voltage across the pair of transparent electrodes, whereby a phase change is imparted to the incident light by the change of refractive index.

The liquid crystal element 63 applied with a voltage from the voltage applying section 64 imparts a phase compensation to light incident thereon to polarize the incident light into substantially linearly polarized light. The voltage applying section which applies a voltage to each of the transparent electrodes of the divided liquid crystal element 63 includes a power supply (not shown) and a modulator which carries out a pulse width modulation (PWM). The operation of the voltage applying section 64 is controlled by the control section 65.

The control section 65 adjusts the amount of phase compensation imparted to light incident on each of the divisions 63*a*, 63*b*, and 63*c* of the liquid crystal element 63, and controls the operation of the voltage applying section 64 for applying a voltage to the divisions 63*a*, 63*b*, and 63*c* of the liquid crystal element 63 so that a spot formed by light transmitted by the liquid crystal element 63 undergoes a phase change that is uniform within the spot. A description will be made later on causes of a difference in the amount of phase change within a light spot formed by diffuse light incident on the liquid crystal element 63 and a method of adjusting the amount of phase compensation to reduce the difference in the amount of phase change.

The control section 65 controls the operation of the voltage applying section 64 not only to reduce a difference in the amount of phase change within a light spot but also to adjust the amount of phase compensation for the liquid crystal element 63 depending on the type of the optical recording medium 29. The control section 65 detects the type of the optical recording medium 29 and applies to each of the divisions of the liquid crystal element 63 a voltage having a predetermined value according to the detected type of the optical recording medium 29. The value of voltage to be applied to each of the divisions of the liquid crystal element 63 in accordance with the type of the optical recording medium 29, i.e., a value of voltage making a refractive index which can impart a proper phase compensation to the incident light, can be obtained in advance through a test for each type of the optical recording medium 29 and each of the divisions 63*a*, 63*b*, and 63*c* of the liquid crystal element 63, and stored in form of table data or in other forms in a memory 65*a* included in the control section 65. The memory 65*a* is composed of, for example, an LSI (Large Scale Integration).

The control section 65 distinguishes the type of the optical recording medium 29 based on an electrical signal obtained by the photodetector 28, that is, for example, TOC (Table Of Contents) information recorded in advance in a magneto-optical recording medium when the magneto-optical optical recording medium is used as the optical recording medium 29.

Further, the liquid crystal element 63 has a problem that characteristics thereof such as optical characteristics are changed by a temperature change. However, in the optical head 61 according to the embodiment, a temperature sensor (not shown) for measuring the temperature on the surface of the liquid crystal element 63 is provided in the vicinity of the liquid crystal element 63, and changes in the characteristics attributable to a temperature change are corrected by use of table data having associated temperatures and voltages, stored in advance in the memory 65*a*.

In a case where a liquid crystal element is used as the phase compensation section, a difference in the amount of phase change within the light spot formed by diffuse light incident on the liquid crystal element is further widened compared to a case where a phase compensation glass is used for the phase compensation section. Hereinbelow will be made a description on causes of the widened difference in the amount of phase change within a light spot formed by diffuse light in a case of using the liquid crystal element, and a method of adjusting the amount of phase compensation so as to reduce the difference in the amount of phase change by use of the liquid crystal element 63 according to the embodiment.

Figure 8A:
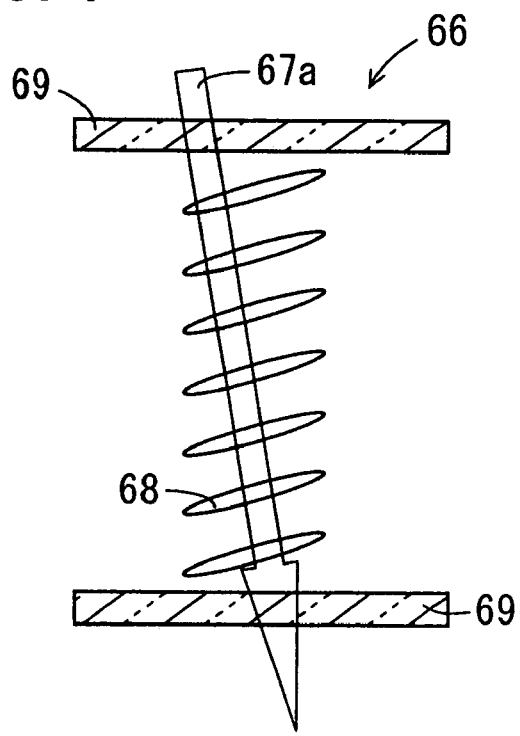
FIG. 8A is a sectional view schematically showing diffuse light being entering the liquid crystal element.
Figure 8B:
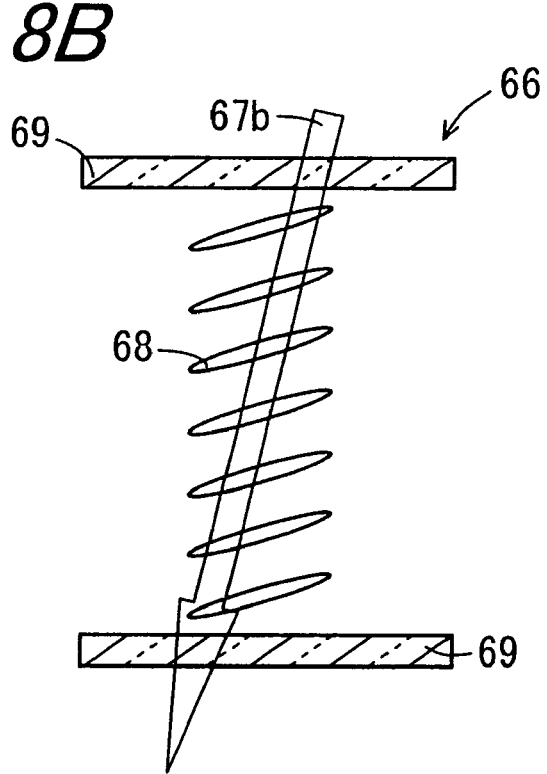
FIG. 8B is a sectional view schematically showing diffuse light being entering the liquid crystal element.

FIGS. 8A and 8B are sectional views schematically showing diffuse light being entering the liquid crystal element 66. FIG. 8A schematically shows light 67*a* entering the liquid crystal element 66 at one peripheral part of the spot of the incident light that is diffuse light. FIG. 8B schematically shows light 67*b* entering the liquid crystal element 66 at the other peripheral part of the spot of the incident light opposite to the part shown in FIG. 8A.

The liquid crystal element 66 comprises a pair of transparent electrodes (not shown), and a liquid crystal layer (not shown) disposed between the pair of transparent electrodes. Liquid crystals 68 forming a liquid crystal layer and the pair of transparent electrodes are confined between glass substrates 69. The liquid crystal element 66 applied with a voltage from the voltage applying section 64 imparts a phase compensation to light incident thereon and polarizes the incident light into substantially linearly polarized light.

When light enters the liquid crystal element, an angle of incidence of light incident thereon changes depending on a refractive-index anisotropy of the liquid crystal constituting the liquid crystal element and as a result, the refractive index of the liquid crystal against the incident light changes. Further, when the angle of incidence of light incident on the liquid crystal changes, a change in refractive index of the light attributable to the change of angle of incidence will make a different amount of phase change of light from a desired amount, despite a condition that the voltage applied to the liquid crystal element is the same and that the refraction characteristics of the liquid crystal element itself is the same.

Such a fluctuation in the amount of phase change causes problems not only between a plurality of beams of light having different angles of incidence, but also, in a case where the incident light is diffuse light, between light in the vicinity of the optical axis of the light spot and light in the vicinity of peripheral parts on both sides of the light spot having the optical axis as a center. Further, the difference in the angle of incidence results in a difference between the refractive index of the liquid crystal in the vicinity of the center of the light spot and the refractive index of the liquid crystal in the vicinity of the peripheral parts of the light spot, and such a difference in the refractive index results in a difference between the amount of phase change in the vicinity of the center of the light spot and the amount of phase change in the vicinity of the peripheral parts of the light spot.

The difference between the amount of phase change at the center of the light spot and the amount of phase change at the peripheral part of the light spot is expressed by Expression (1) shown below where the term "refractive-index difference" means a difference between the refractive index at the center of the light spot and the refractive index at the peripheral part of the light spot attributable to the change of angle of incidence despite a condition that the voltage applied to the liquid crystal element is the same and that the refraction characteristics of the liquid crystal element itself is the same.

(difference in the amount of phase change)=(refractive-index difference)×(liquid crystal thickness)× 360/(wavelength of the incident light)    (1)

As apparent from Expression (1), when the amount of phase change varies in the same light spot, even with application of an amount of phase compensation that is optimum in the vicinity of the center of the light spot to entire light spot of the incident light that is diffuse light, the amount of phase change of incident light at a peripheral part of the light spot will be different from an optimum value.

Figure 9:
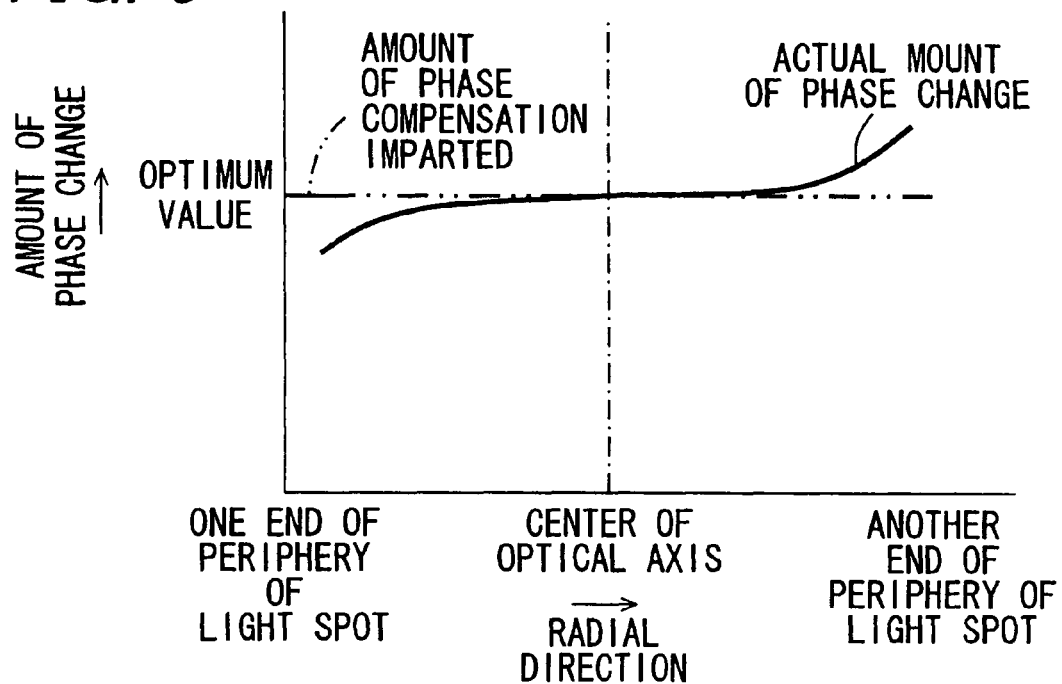
FIG. 9 is a view showing amounts of phase changes at various positions of a light spot in a radial direction, the phase changes being caused when an amount of phase compensation which is optimal at the center of the optical axis of diffusion light incident on an undivided liquid crystal element is imparted uniformly to the entire incident light.

FIG. 9 is a view showing amounts of phase changes at various positions of a light spot in the radial direction, the phase changes being caused when an amount of phase compensation which is optimal at the center of the optical axis of diffusion light incident on an undivided liquid crystal element is imparted uniformly to the entire incident light. The liquid crystal element imparts the amount of phase compensation that is optimal at the center of the incident light which is diffuse light (the center of the light spot) to the entire light spot. As a result, the incident light can be substantially linearly polarized in the vicinity of the center of the light spot formed by the incident light.

However, as described above, the amount of phase change deviates from an optimum value because the angle of incidence of the incident light which is diffuse light is different from that at the center of the optical axis even when the amount of phase compensation that is optimum at the center of the light spot is imparted to the entire light spot. When the amount of phase change at the peripheral part of the light spot deviates from an optimum value as thus described, the state of polarization of the light at the peripheral part of the light spot shifted from linear polarization to elliptic polarization.

In order to reduce such a variation in the amount of phase change within a light spot caused by a difference in the refractive index attributable to a difference in the angle of incidence of light, the optical head 61 according to the embodiment employs the liquid crystal element 63 which is divided into a plurality of divisions 63a, 63b, and 63c as shown in FIG. 7. The liquid crystal element 63 having the divisions 63a, 63b, and 63c as shown in FIG. 7 can set a different refractive index for light incident on each of the divisions 63a, 63b, and 63c by applying different voltages to the transparent electrodes provided in the divisions 63a, 63b, and 63c, respectively. Thus, a different amount of phase compensation can be imparted to light incident on each of the divisions 63a, 63b, and 63c.

Figure 10:
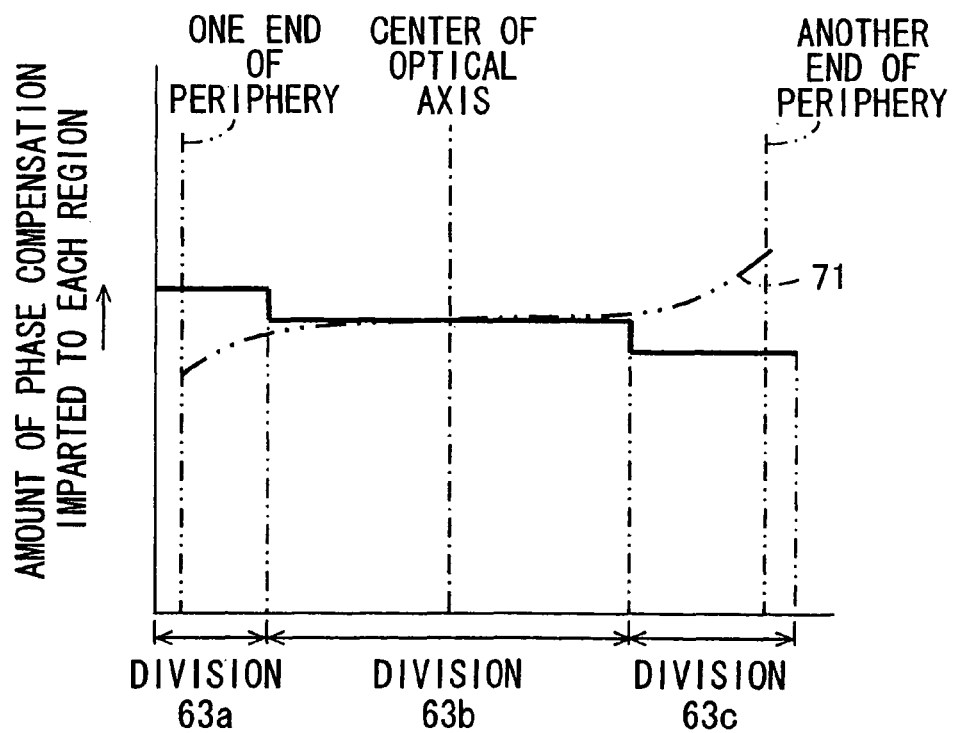
FIG. 10 is a view showing amounts of phase compensation imparted to incident light that is diffuse light, by the liquid crystal element having a plurality of divisions shown in FIG. 7.

FIG. 10 shows amounts of phase compensation imparted to incident light that is diffuse light by the liquid crystal element 63 having a plurality of divisions shown in FIG. 7. In FIG. 10, the solid line represents the amounts of phase compensation imparted to incident light in the divisions 63a, 63b, and 63c. In FIG. 10, a line 71 in a chain double-dashed line represents amounts of phase changes that occur when an amount of phase compensation is uniformly imparted to a light spot of diffuse light incident on the above-described liquid crystal element which is not divided into a plurality of parts.

In the division 63a, an amount of phase compensation greater than the amount of phase compensation in the vicinity of the center of the light spot is imparted to an end of the periphery of the light spot where the actual amount of a phase change is smaller than an optimum value. In the division 63b, no change is made in the amount of phase compensation because the difference between the actual amount of phase change and the optimum amount of phase change is small. In the division 63c, an amount of phase compensation smaller than the amount of phase compensation in the vicinity of the center of the light spot is imparted to another end of the periphery of the light spot where the actual amount of phase change is greater than the optimum value.

Note that, in order to vary the amount of phase compensation between the divisions 63a, 63b, and 63c of the liquid crystal element 63 as thus described, the voltages applied to the transparent electrodes provided in the divisions 63a, 63b, and 63c may have values which are, for example, obtained through a test and stored in a memory 65a provided in the control section 65 in advance.

Figure 11:
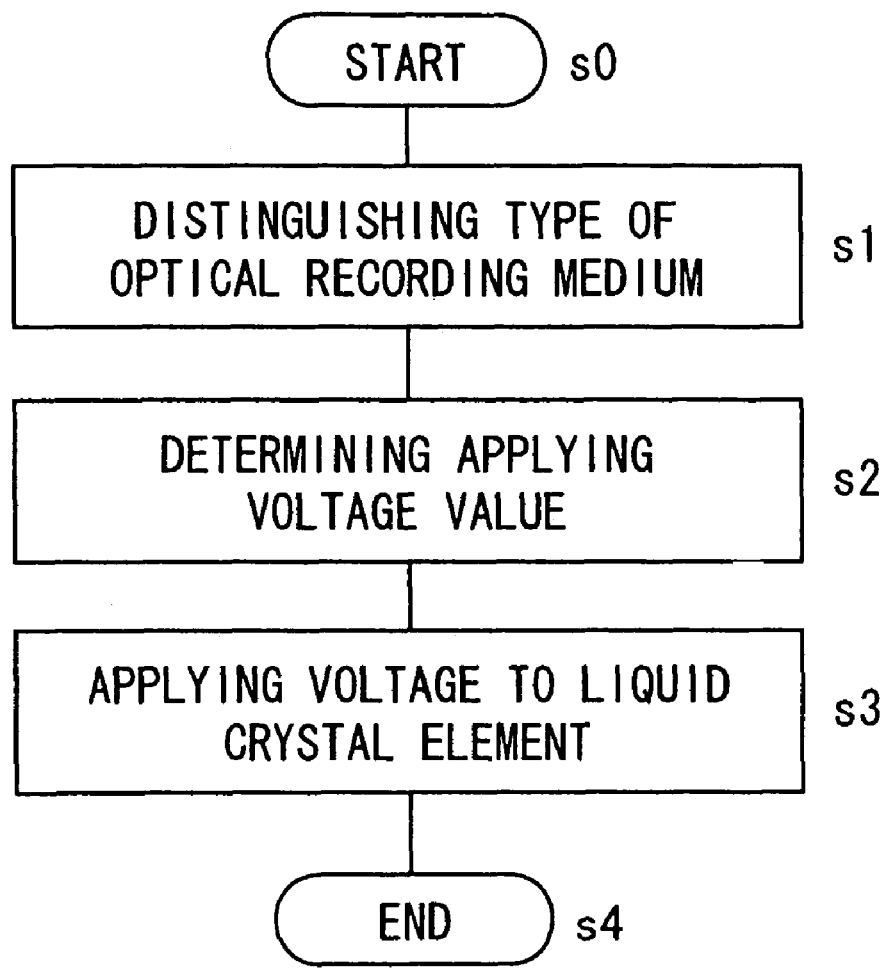
FIG. 11 is a flowchart showing a control procedure conducted by a control section, for applying a voltage to the liquid crystal element.

FIG. 11 is a flowchart showing a control procedure conducted by the control section 65, for applying a voltage to the liquid crystal element 63. In the present embodiment will be described a case of reproducing information recorded on the optical recording medium 29, i.e., an MD or Hi-MD. At Step s0, a signal is inputted to the control section 65 so that the information on the optical recording medium 29 is reproduced and thereafter, Step s1 follows.

At Step s1, the control section 65 distinguishes the type of the optical recording medium 29 based on the TOC information stored in the optical recording medium 29 in advance. After the type of the optical recording medium 29 has been distinguished, Step s2 follows.

At Step s2, the control section 65 determines a value of voltage to be applied to the liquid crystal element 63 according to the type of information on the optical recording medium 29, which has been obtained at Step s1. The value of voltage is a value which has been obtained by a test for each type of the optical recording medium 29 and stored in the memory 65a in advance. After the value of voltage to be applied to the liquid crystal element 63 has been determined, Step s3 follows.

At Step s3, the control section 65 controls the operation of the voltage applying section 64 so that the voltage of the value determined at Step s2 is applied to the liquid crystal element 63. By means of the control on the operation of the voltage applying section 64 through the control section 65, the voltage of the predetermined value is applied to the liquid crystal element 63. After the voltage of the predetermined value has been applied to the liquid crystal element 63, Step s4 follows to end the operation for control.

Figure 12:
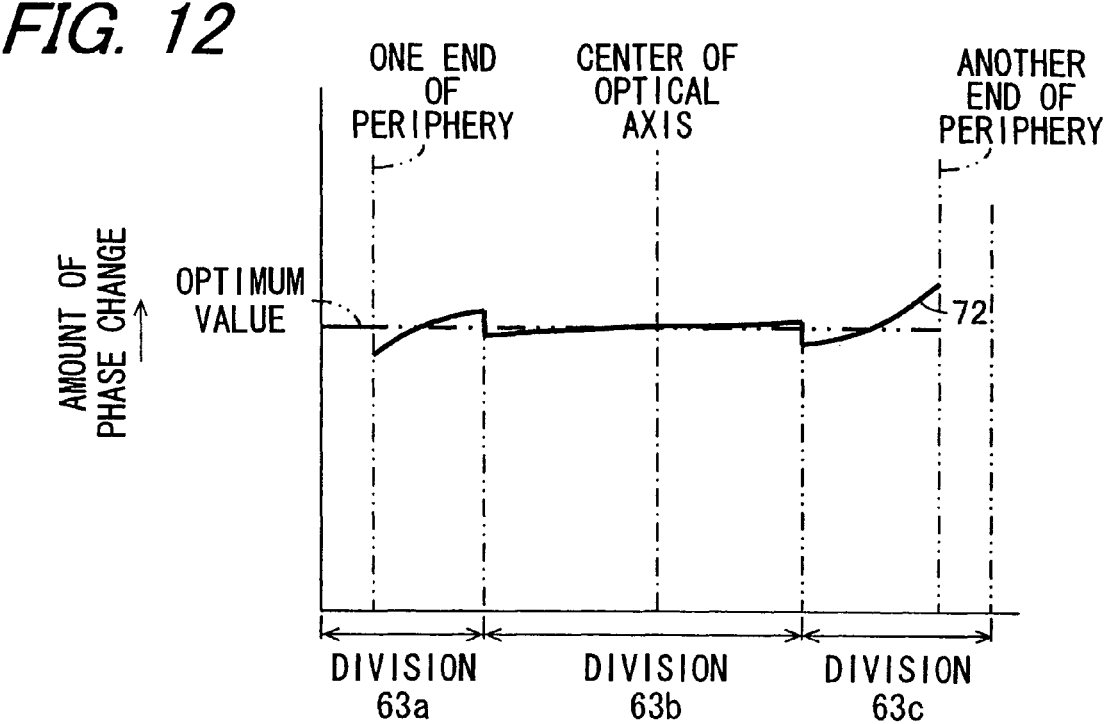
FIG. 12 is a view showing an amount of phase change in each division caused when a different amount of phase compensation is imparted to diffuse light incident on the liquid crystal element having a plurality of divisions.

FIG. 12 is a view showing an amount 72 of phase change in each division measured when a different amount of phase compensation is imparted to diffuse light incident on the liquid crystal element 63 having a plurality of divisions. The liquid crystal element 63 is divided into a plurality of parts, and the amount of phase compensation is varied by applying different voltages from the voltage applying section 64 to the vicinity of the center of the light spot and the vicinity of peripheral parts of the spot. As a result, differences in the amount of phase change within the light spot from an optimum value can be made small, and differences between the amounts of phase change within the light spot can be reduced.

Figure 13:
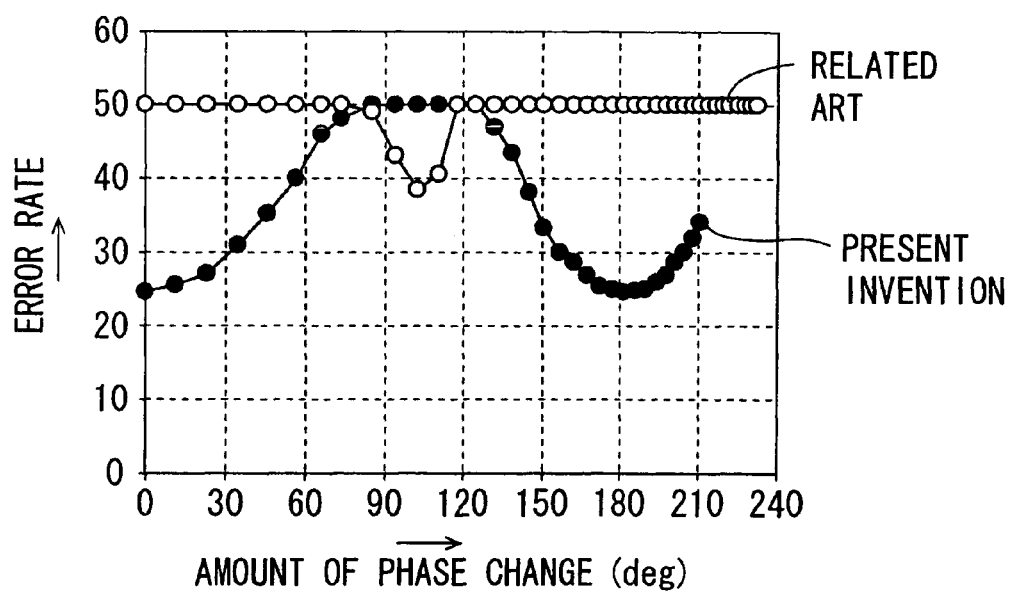
FIG. 13 is a view showing error rates at the time of reproduction of the optical recording medium performed with phase compensation imparted by the undivided liquid crystal element, and error rates at the time of reproduction of the optical recording medium performed with phase compensation imparted by the liquid crystal element having a plurality of divisions.

FIG. 13 shows error rates at the time of reproduction of the optical recording medium 29 performed with phase compensation imparted by the undivided liquid crystal element, and error rates at the time of reproduction of the optical recording medium 29 performed with phase compensation imparted by the liquid crystal element 63 having a plurality of divisions. White circles represent the error rates in a case where phase compensation is imparted by the liquid crystal element which is not divided into a plurality of parts (related art), and black circles represent the error rates in a case where phase compensation is imparted by the liquid crystal element 63 having a plurality of divisions provided in the optical head 61 according to the invention (the present invention). The amounts of phase compensation shown along a horizontal axis in the case of the liquid crystal element 63 having a plurality of divisions are amounts of phase compensation imparted in the division 63b. The term "error rate" means a measured number of errors which have occurred in a unit time. The error rates were measured using an MD as the optical recording medium 29.

As shown in FIG. 13, the error rates measured when phase changes are imparted by the liquid crystal element 63 having a plurality of divisions, are significantly smaller than the error rates measured when phase changes are imparted by the liquid crystal element which is not divided into a plurality of parts, with respect to most amounts of phase compensation except in a certain range (from about 90° to 120°). As thus described, a liquid crystal element may be divided into a plurality of parts to allow voltages applied to the vicinity of the center of a light spot and the vicinity of peripheral parts of the spot to be appropriately chosen. It will be understood that the amount of phase compensation can be varied between the divisions to reduce a difference in the amount of phase change within the light spot and that recording and reproduction characteristics of the optical recording medium 29 can be improved.

Figure 14:
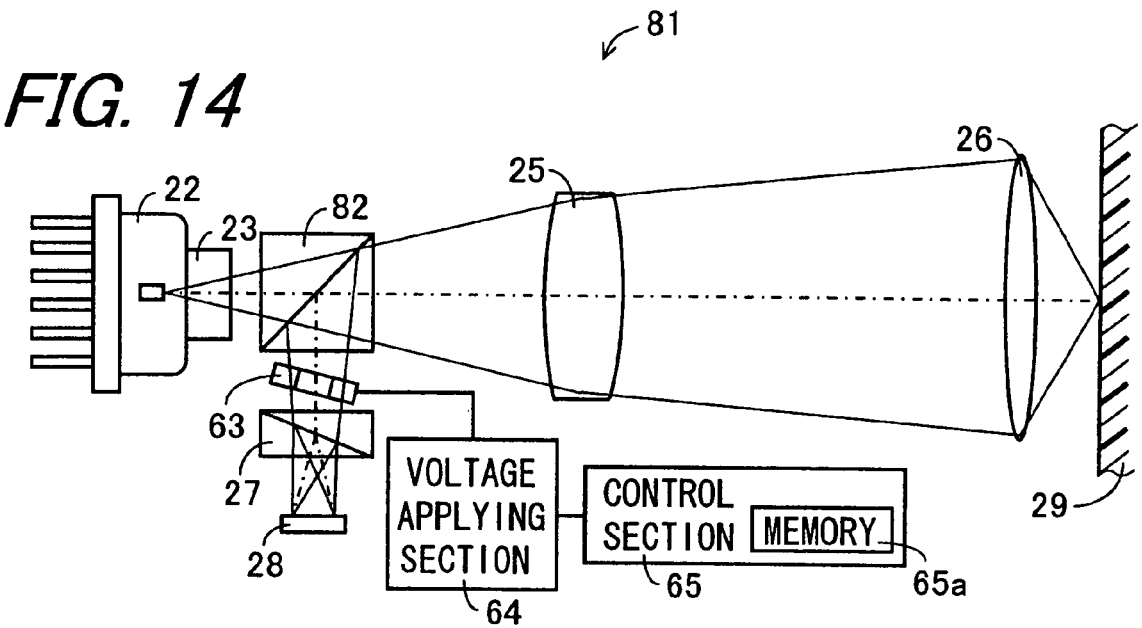
FIG. 14 is a side view showing a schematic configuration of an optical head according to a third embodiment of the invention.
Figure 15:
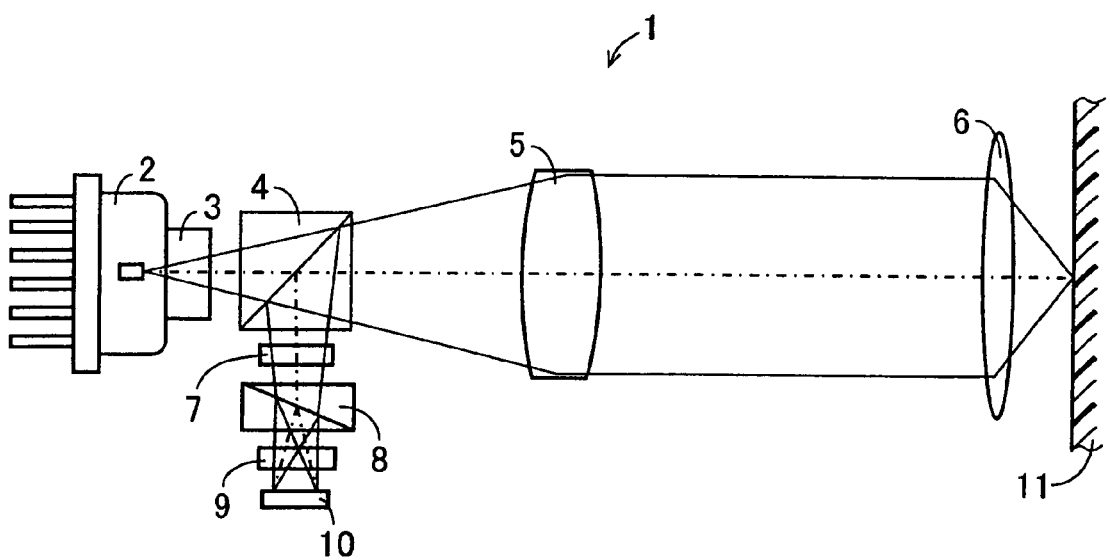
FIG. 15 is a side view showing a schematic configuration of an optical head disclosed in JP-A 2003-296960.

FIG. 14 is a side view showing a schematic configuration of an optical head 81 according to a third embodiment of the invention. The optical head 81 comprises a grating 23, a beam splitter 82, a coupling lens 25, an objective lens 26, a liquid crystal element 63, a voltage applying section 64, a control section 65, a Wollaston prism 27, and a photodetector 28. In this embodiment, the beam splitter 82 serving as a light separating section and the liquid crystal element 63 constituting the phase compensation section are not integrally formed with each other.

The optical head 81 according to the present embodiment is characterized as comprising the liquid crystal element 63, the voltage applying section 64, and the control section 65. The liquid crystal element 63 is provided on the light path of the return light between the beam splitter 82 serving as a light separating section and the photodetector 82 serving as a light-receiving element, and provided with a plurality of divisions. The voltage applying section 64 applies a voltage respectively to each of the plural divisions of the liquid crystal element 63 to thereby change refractive indexes of the respective divisions. The control section 65 adjusts the amount of phase compensation imparted to light incident on each of the divisions of the liquid crystal element 63, and controls the operation of the voltage applying section 64 for applying a voltage to the divisions of the liquid crystal element 63 so that a spot formed by light transmitted by the liquid crystal element 63 undergoes a phase change that is uniform within the spot.

The beam splitter 82 is a light separating section for separating the outgoing light emitted by the semiconductor laser element 22 and the return light which has been emitted by the semiconductor laser element 22 and then reflected by the optical recording medium 29. The beam splitter 82 transmits the outgoing light emitted by the semiconductor laser element 22 to guide the outgoing light to the objective lens 26, and reflects the return light reflected by the optical recording medium 29 to guide the return light to the photodetector 28.

The coupling lens 25 is a diffusing angle adjusting element for adjusting a diffuse angle of the light incident on the objective lens 26. The coupling lens 25 is disposed between the semiconductor laser element 22 and the objective lens 26, and more specifically in the embodiment, disposed between the beam splitter 82 and the objective lens 26. The coupling lens 25 changes the diffusing angle of the light incident thereon, which has been emitted by the semiconductor laser element 22 and transmitted by the grating 23 and beam splitter 82, for example, to a smaller angle and then, emits the light so that the incident light enters the objective lens 26. By employing the coupling lens 25 thus described, it is possible to reduce in size in a direction of optical axis of emitted light of the optical head 81 and to reduce in size in a focus direction of the objective lens 26 and moreover, to enhance the intensity of light exiting the objective lens 26.

The liquid crystal element 63 is provided on the light path of the return light between the beam splitter 82 serving as a light separating section and the photodetector 28 serving as a light-receiving element, and provided with a plurality of divisions 63a, 63b, and 63c.

Further, in the embodiment, the liquid crystal element 63 is disposed at a slant with respect to the optical axis of the return light between the beam splitter 82 and he photodetector 28. A direction in which the liquid crystal element 63 is inclined with respect to the optical axis of the return light between the beam splitter 82 and the photodetector 28, is a radial direction (Y-axis direction) of the optical recording medium 29 in a recording or reproducing state.

By disposing the liquid crystal element 63 at a slant with respect to the optical axis of the return light between the beam splitter 82 and the photodetector 28, it is possible to generate astigmatism with respect to the light incident on the liquid crystal element 63, so that optical components such as a cylindrical lens for generating astigmatism are no more necessary. Consequently even in a case where the light separating section and the phase compensation section are not integrally formed with each other, it is possible to realize decrease in the number of components and further reduction in size of the optical head.

Furthermore, the direction in which the liquid crystal element 63 is inclined with respect to the optical axis of the return light between the beam splitter 82 and the photodetector 28, is the Y-axis direction which is the radial direction of the optical recording medium 29 in a recording or reproducing state and therefore, it is possible to use the favorable liquid crystal element 63 as described above, having the divisions 63a, 63b, and 63c which are formed by dividing the liquid crystal element 63 in parallel with the Y-axis direction, to thereby uniformalize the phase change of light within the light spot and moreover to impart the astigmatism to the light spot.

Furthermore, by employing the liquid crystal element 63 as the phase compensation section, the amount of phase compensation imparted to the incident light can be made to an optimum value for each reproduction in accordance with the applied voltage from the voltage applying section 64. Accordingly, in a case where the optical head 61 according to the embodiment is mounted on the disc reproducing apparatus which is compatible with both of MDs and Hi-MDs, it is possible to impart the optical amount of phase compensation in both cases of reproducing MDs and Hi-MDs.

The disc reproducing apparatus having the optical head according to the invention as described above allows reduction in difference of amount of phase change within the light spot, which is attributable to the angle of incidence of the light, and allows enhancement of the reproduction characteristics of the optical recording medium 29. Note that the disc reproducing apparatus having the optical head according to the invention is not limited to the apparatus for only reproducing the information recorded on the optical recording medium 29, and also available is an apparatus for both of recording the information onto the optical recording medium 29 and reproducing the information recorded on the optical recording medium 29.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An optical head for recording and/or reproducing information by irradiating an optical recording medium with light, comprising:
   a light source for emitting light;
   an objective lens for converging outgoing light which has been emitted by the light source, on the optical recording medium;
   a light-receiving element for receiving return light which has been emitted by the light source and then reflected by the optical recording medium; and
   an optical element provided on a light path of the return light between the objective lens and the light-receiving element,
   the optical element comprising a light separating section for separating the outgoing light and return light integrally formed with a phase compensation section for imparting phase compensation to light incident thereon,
   the phase compensation section being disposed closer to the light-receiving element than the light separating section is, being configured so that a face of the phase compensation section which faces the light-receiving element is inclined with respect to an optical axis of the return light between the objective lens and the light-receiving element, and having a plurality of divisions,
   wherein a direction in which the plurality of divisions of the phase compensation section are arranged is parallel to a radial direction of the optical recording medium in a recording or reproducing state.

2. The optical head of claim 1, further comprising a diffusing angle adjusting element disposed between the optical element and the objective lens, for adjusting a diffusing angle of light incident on the objective lens.

3. The optical head of claim 1, wherein the phase compensation section is a phase compensation glass having the plurality of divisions, at least one of which has a different refractive index from a refractive index of another division.

4. The optical head of claim 1, wherein the phase compensation section comprises:
   a liquid crystal element having the plurality of divisions;
   a voltage applying section for applying a voltage respectively to each of the plurality of divisions of the liquid crystal element to change a refractive index of each of the divisions; and
   a control section for adjusting an amount of phase compensation given to each of the divisions with respect to light incident on the divisions of the liquid crystal element, and controlling an operation of the voltage applying section for applying the voltage to the divisions of the liquid crystal element so that a spot of light transmitted by the liquid crystal element undergoes a phase change which is uniform within the spot.

5. The optical head of claim 4, wherein the liquid crystal element comprises a transparent electrode in each of the divisions.

6. The optical head of claim 4, wherein a direction in which the plurality of divisions of the liquid crystal element are arranged is parallel to the radial direction of the optical recording medium in a recording or reproducing state.

7. The optical head of claim 4, wherein a direction in which the liquid crystal element is inclined with respect to the optical axis of the return light between the light separating section and the light-receiving element, is the radial direction of the recording medium in a recording or reproducing state.

8. The optical head of claim 4, further comprising a diffusing angle adjusting element for adjusting a diffusing angle of light incident on the objective lens, the diffusing angle adjusting element being disposed between the light source and the objective lens.

9. The optical head of claim 4, further comprising an anisotropic element for separating the return light traveling from the optical recording medium, which has been reflected by the optical recording medium and then separated by the light separating section, to lead the separated light to enter the light receiving element, the anisotropic element being disposed between the liquid crystal element and the light-receiving element.

10. The optical head of claim 1, wherein the light source emits laser light having a wavelength of 780 nm or less, and the objective lens has a numerical aperture (NA) of 0.45 or more.

11. A disc reproducing apparatus having the optical head of claim 1.

* * * * *